United States Patent
Bellert (10) Patent No.: US 9,697,423 B1
(45) Date of Patent: Jul. 4, 2017

(54) IDENTIFYING THE LINES OF A TABLE

(71) Applicant: Konica Minolta Laboratory U.S.A., Inc., San Mateo, CA (US)

(72) Inventor: Darrell Eugene Bellert, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 14/986,007

(22) Filed: Dec. 31, 2015

(51) Int. Cl.
*G06K 9/00* (2006.01)
*G06K 5/04* (2006.01)

(52) U.S. Cl.
CPC ........... *G06K 9/00456* (2013.01); *G06K 5/04* (2013.01); *G06K 9/00416* (2013.01)

(58) Field of Classification Search
None
See application file for complete search history.

(56) References Cited

U.S. PATENT DOCUMENTS

| | | | | |
|---|---|---|---|---|
| 5,195,147 A * | 3/1993 | Ohta | ................... | G06K 9/00476 382/176 |
| 5,235,653 A * | 8/1993 | Nakano | ............... | G06K 9/00449 382/175 |
| 5,392,130 A * | 2/1995 | Mahoney | ................... | G06T 7/00 358/400 |
| 6,411,732 B1 * | 6/2002 | Saund | ................. | G06F 3/04883 382/187 |
| 7,409,088 B2 * | 8/2008 | Li | ........................... | G06K 9/222 382/186 |
| 7,440,616 B2 * | 10/2008 | Li | ....................... | G06K 9/00476 382/186 |
| 7,664,325 B2 * | 2/2010 | Lin | ..................... | G06K 9/00416 382/179 |
| 8,634,645 B2 * | 1/2014 | Xing | ..................... | G06F 17/245 382/181 |
| 9,489,572 B2 * | 11/2016 | Melinand | ........... | G06K 9/00422 |
| 2006/0061778 A1 * | 3/2006 | Chen | ..................... | G06F 3/0488 358/1.8 |
| 2009/0245645 A1 * | 10/2009 | Xing | .................. | G06K 9/00422 382/189 |
| 2014/0029853 A1 * | 1/2014 | Xue | .................... | G06K 9/00449 382/182 |

* cited by examiner

*Primary Examiner* — Soo Park
(74) *Attorney, Agent, or Firm* — Osha Liang LLP (57) ABSTRACT

A method for image processing, including: obtaining an image including a table; identifying a first plurality of geometric lines in the image; grouping the first plurality of geometric lines into a plurality of clusters; determining a plurality of hand-drawn lines in the image corresponding to the table from the plurality of clusters; calculating a plurality of points for the plurality of hand-drawn lines; and determining a geometry of the table based on the plurality of points.

20 Claims, 7 Drawing Sheets

Image
(Following Clustering)
314

Image
306

FIG. 3A

Hand-drawn
Table
308

FIG. 3B

Image
(Following conversion
to mask & rotation)
310

Image
(Following Hough
Transform)
312

FIG. 3C

Image
(Following Clustering)
314

FIG. 3D

Image
(Following removal of determined
hand drawn lines)
316

FIG. 3E

Image
(Following Clustering)
318

FIG. 3F

Image
(Following removal of all hand drawn lines)
320

FIG. 3G

New Geometric Lines passing through calculated midpoints
330

IDENTIFYING THE LINES OF A TABLE

BACKGROUND

An image may include a table with rows and columns bounded by hand-drawn lines. For example, the image may be a scan of a hand-drawn page. These hand-drawn lines are rarely straight, making it difficult for image processing devices to determine the geometry of the table (e.g., upper left corner, extents, number of rows and columns, cell positions). These hand-drawn lines also make it difficult to generate a high-level representation of the table that can be included in an electronic document (e.g., word processing document, spreadsheet, slide show, webpage, etc.). Regardless, users still wish to have image processing devices operate on hand-drawn tables.

SUMMARY

In general, in one aspect, the invention relates to a method for image processing. The method comprises: obtaining an image comprising a table; identifying a first plurality of geometric lines in the image; grouping the first plurality of geometric lines into a plurality of clusters; determining a plurality of hand-drawn lines in the image corresponding to the table from the plurality of clusters; calculating a plurality of points for the plurality of hand-drawn lines; and determining a geometry of the table based on the plurality of points.

In general, in one aspect, the invention relates to a non-transitory computer readable medium (CRM) storing computer readable program code embodied therein. The computer readable program code: obtains an image comprising a table; identifies a first plurality of geometric lines in the image; groups the first plurality of geometric lines into a plurality of clusters; determines a plurality of hand-drawn lines in the image corresponding to the table from the plurality of clusters; calculates a plurality of points for the plurality of hand-drawn lines; and determines a geometry of the table based on the plurality of points.

In general, in one aspect, the invention relates to a system for image processing. The system comprises: a buffer storing an image comprising a table; a line extractor that identifies a first plurality of geometric lines in the image; a cluster engine that groups the first plurality of geometric lines into a plurality of clusters; and a table engine that: determines a plurality of hand-drawn lines in the image corresponding to the table from the plurality of clusters; calculates a plurality of points for the plurality of hand-drawn lines; and determines a geometry of the table based on the plurality of points.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system for image processing. An image including a table with hand-drawn lines is obtained and converted into a mask. Multiple geometric lines within the image are identified (e.g., by applying the Hough Transform to the image) and then clustered. The strongest geometric line (i.e., the one with the most source pixels contributing to it) is selected and used to determine one of the hand-drawn lines in the table. A midpoint may be calculated for each determined hand-drawn line. The geometry of the table (e.g., upper left corner, extents, number of rows and columns, cell positions) may be determined by reconstructing the table using new horizontal and vertical geometric lines that pass through the calculated midpoints. A high-level object representation of the table may also be generated and exported to an application for inclusion in an electronic document (e.g., word processing document, spreadsheet, slide show, webpage, etc.).

Figure 1:
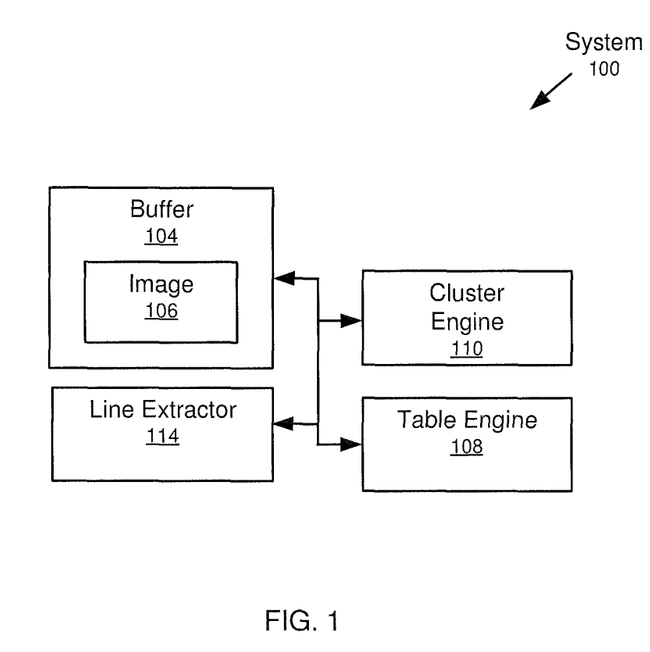
FIG. 1 shows a system in accordance with one or more embodiments of the invention.

FIG. 1 shows a system (100) in accordance with one or more embodiments of the invention. As shown in FIG. 1, the system (100) has multiple components, including, for example, a buffer (104), a line extractor (114), a cluster engine (110), and a table engine (108). Each of these components (104, 108, 110, 114) may be located on the same computing device (e.g., personal computer (PC), laptop, tablet PC, smart phone, multifunction printer, kiosk, server, etc.) or on different computing devices connected by a network of any size having wired and/or wireless segments. Each of these components is discussed below.

In one or more embodiments of the invention, the system (100) includes the buffer (104). The buffer (104) may be implemented in hardware (i.e., circuitry), software, or any combination thereof. The buffer (104) is configured to store an image (106) including a table having any number of rows and columns. Each cell of the table may have text and/or graphics. In one or more embodiments, the table in the image (106) is hand-drawn. Accordingly, the hand-drawn lines bounding the rows and columns of the table might not be perfectly horizontal or perfectly vertical. The image (106) may be obtained (e.g., downloaded) from any source. Further, the image (106) may be of any size and in any format (e.g., JPEG, GIF, BMP, PNG, etc.).

In one or more embodiments of the invention, the system (100) includes the line extractor (114). The line extractor (114) may be implemented in hardware (i.e., circuitry), software, or any combination thereof. The line extractor (114) identifies geometric lines in the image, an angle for each geometric line (e.g., with respect to the horizontal or vertical axis), and a confidence value for each geometric line (i.e., the number of pixels in the image that contribute to the geometric line). In one or more embodiments of the invention, the line extractor (114) applies the Hough Transform to the image (106) to identify the geometric lines, the angles of the geometric lines, and the confidence values of the geometric lines. In one or more embodiments of the invention, the line extractor (114) converts the image (106) to a mask (e.g., a binary image) before identifying geometric lines in the image (106) to improve the line identification process. In one or more embodiments of the invention, the line extractor (114) rotates the image (106) to better align the table with the horizontal and/or vertical axis before identifying geometric lines in the image (106).

In one or more embodiments of the invention, the line extractor (114) discards geometric lines that fail to meet one or more criteria. For example, the confidence value of a geometric line may be compared with a threshold, and the geometric line may be discarded if the confidence value is below the threshold. The threshold may be computed as a percentage P of the average confidence value of the most confident N geometric lines. In other words, the average confidence value is computed for the N geometric lines with the highest confidence values, and any geometric line with a confidence value less than P of that average confidence value is discarded. For example, P=50%, and N=10.

In one or more embodiments of the invention, the system (100) includes the cluster engine (110). The cluster engine (110) may be implemented in hardware (i.e., circuitry), software, or any combination thereof. The cluster engine (110) is configured to group the multiple geometric lines found from the line extractor (114) into one or more clusters. Geometric lines belong in a cluster C if: (a) the geometric line intersects with any other line in C within the domain of the image; or (b) the geometric line is within K pixels (i.e., within a threshold of pixels) of a parallel line in C. K may be set to a minimum allowed size (width or height) of a cell in the table. For example, K=10. Specifically, the cluster engine (110) may first classify each geometric line as vertical or horizontal. For example, any geometric line with an angle within the 0-45 degrees range or 135-180 degrees range may be classified as horizontal. In contrast, any geometric line with an angle outside the mentioned ranges may be classified as vertical. Multiple clusters are then generated for the geometric horizontal lines and the geometric vertical lines. In one or more embodiments, vertical geometric lines and horizontal geometric lines are not placed in the same cluster.

In one or more embodiments of the invention, the system (100) includes the table engine (108). The table engine (108) may be implemented in hardware (i.e., circuitry), software, or any combination thereof. The table engine (108) is configured to determine, in the image (106), hand-drawn lines of the table based on the clusters. In other words, the table engine (108) is configured to determine the pixels in the image (106) corresponding to each of the hand-drawn lines of the table using the clusters.

In one or more embodiments, for each cluster, the table engine (108) selects the geometric line with the maximum (i.e., highest) confidence value. This selected geometric line is used to trace the pixels of the hand-drawn line in the image (106). These pixels may be added to a data structure (e.g., list) and then removed from the image (106). The table engine (108) also calculates a point (e.g., midpoint, ¼ point, ⅓ point etc.) for the hand-drawn line using these pixels in the data structure.

In one or more embodiments of the invention, various tests are applied to determine if the hand-drawn line is a false positive (i.e., a group of pixels in the image (106) that is actually not a table line). For example, the hand drawn line can be checked to see if it has a large number of gaps or if it intersects with a region of pixels that has been identified as text by a text recognition engine. In such scenarios, the determined hand-drawn line is removed from the image (106), but its pixels are not added to the data structure and the table engine (108) does not calculate its midpoint, ¼ point, etc.

In one or more embodiments of the invention, the table engine (108) determines a geometry of the table (e.g., upper left corner, extents, number of row, number of columns, cell positions, etc.) based on the calculated points. Specifically, the table engine (108) may generate new horizontal and vertical geometric lines that pass through calculated points. Any two of the new geometric lines having the same orientation are parallel. In other words, all of the new horizontal geometric lines are parallel. Similarly, all of the new vertical geometric lines are parallel. It is through the use of these new geometric lines and the intersections of these new geometric lines with each other that the geometry of the table can be determined. If the image was previously rotated, it may be necessary to apply a reverse rotation to the newly generated geometric lines to determine the geometry of the table (e.g., upper left corner).

In one or more embodiments of the invention, the table engine (108) generates a high-level object representing the table. This high-level object may specify (e.g., using tags and attributes) the geometry of the table. This high-level object might also include the contents of the table (e.g., extracted from the cells in the image (106) through optical character recognition (OCR) or intelligent character recognition (ICR)). In one or more embodiments, the high-level object may be exported to an application for inclusion in an electronic document (e.g., spreadsheet, slide show, word processing document, webpage, etc.).

Although the system (100) is shown as having four components (104, 108, 110, 114), in other embodiments of the invention, the system (100) may have more or fewer components. Further, the functionality of each component described above may be split across components. Further still, each component (104, 108, 110, 114) may be utilized multiple times to carry out an iterative operation.

Figure 2:
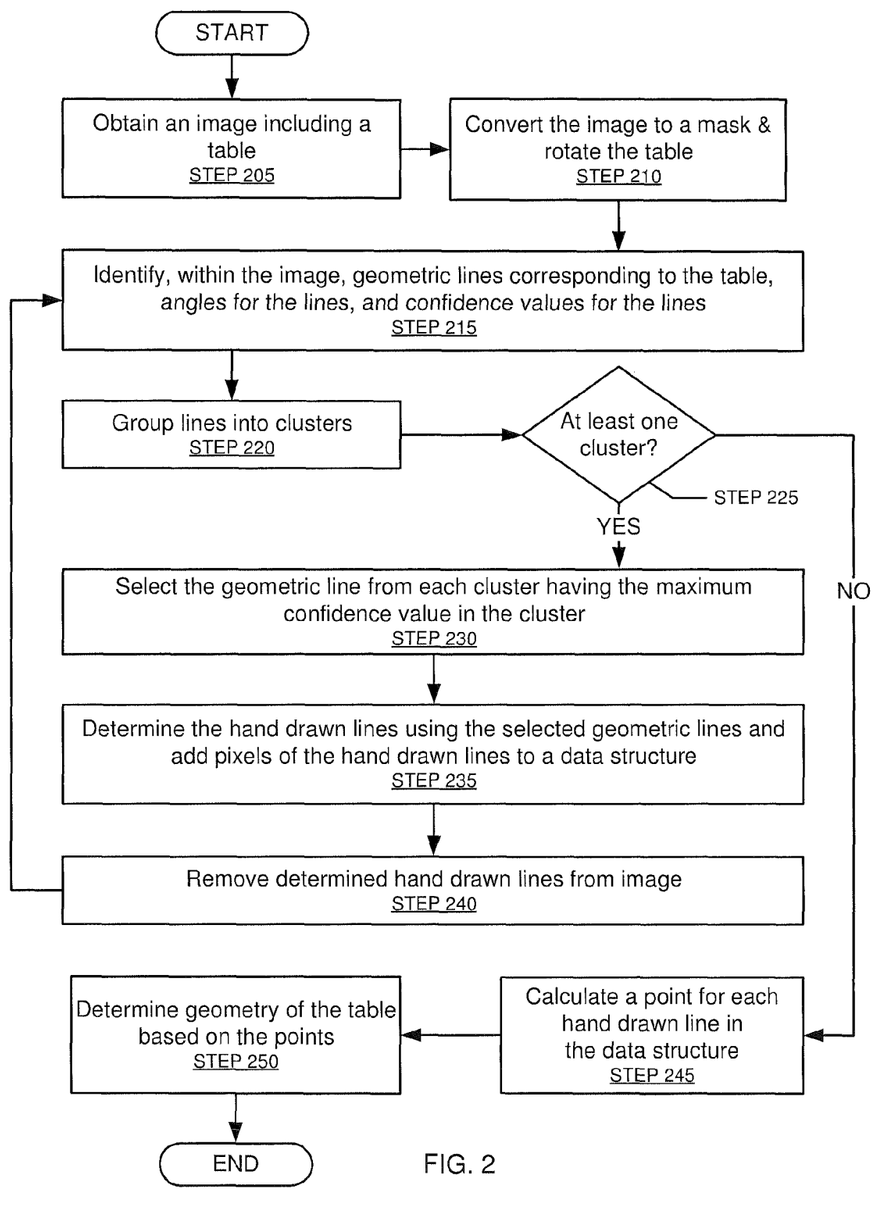
FIG. 2 shows a flowchart in accordance with one or more embodiments of the invention.

FIG. 2 shows a flowchart in accordance with one or more embodiments of the invention. The flowchart depicts a process for image processing. Specifically, the flowchart depicts a process for identifying the lines of a hand-drawn table. One or more of the steps in FIG. 2 may be performed by the components of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, an image including a table is obtained (STEP 205). The image may be obtained (e.g., downloaded) from any source and may be of any size or format. In one or more embodiments, the table in the image is hand-drawn. In other words, the table has hand-drawn lines that bound the rows and columns of the table. These hand-drawn lines are not perfectly straight. Further, each cell of the table may have text and/or graphics.

In STEP 210, the image is converted into a mask. In other words, the image is converted to a binary image. Pixels corresponding to the hand-drawn lines of the table and/or the text characters in the cells may be set to 1, while all remaining pixels are set to 0. Further, the table may be rotated to better align the table with the horizontal and/or vertical axis.

In STEP 215, geometric lines are identified within the image. The angle of each geometric line (e.g., with respect to the horizontal or vertical axis) and a confidence value for each geometric line (i.e., the number of pixels in the image that contribute to the geometric line) are also identified. In one or more embodiments of the invention, the geometric lines, the angles of the geometric lines, and the confidence values of the geometric lines are identified by applying the Hough Transform to the image. Other transforms may also be used to identify the geometric lines.

In one or more embodiments of the invention, geometric lines that fail to meet one or more criteria are discarded. For example, the confidence value of a geometric line may be compared with a threshold, and the geometric line may be discarded if the confidence value is below the threshold. The threshold may be computed as a percentage P of the average confidence value of the most confident N geometric lines. In other words, the average confidence value is computed for the N geometric lines with the highest confidence values, and any geometric line with a confidence value less than P of that average confidence value is discarded.

As shown in FIG. 2, STEP 215 may be repeated multiple times in the process. In one or more embodiments, the same values of P and N are used for each iteration.

In STEP 220, the geometric lines are grouped into clusters. Geometric lines belong in a cluster C if: (a) the geometric line intersects with any other line in C within the domain of the image; or (b) the geometric line is within K pixels (i.e., within a threshold of pixels) of a parallel line in C. K may be set to a minimum allowed size (width or height) of a cell in the table. Specifically, this may first involve classifying each geometric line as either horizontal or vertical. For example, any geometric line with an angle within the 0-45 degrees range or 135-180 degrees range may be classified as horizontal. In contrast, any geometric line with an angle outside the mentioned ranges may be classified as vertical. Multiple clusters are then generated for the geometric horizontal lines and the geometric vertical lines. In one or more embodiments, vertical geometric lines and horizontal geometric lines are not placed in the same cluster. Those skilled in the art having the benefit of this detailed description will appreciate that a single cluster may include geometric lines corresponding to two different hand-drawn lines in the image.

In STEP 225, it is determined if at least one cluster exists. When it is determined that at least one cluster exists, the process proceeds to STEP 230. However, when it is determined that no clusters exist (e.g., no geometric lines meeting the necessary criteria were identified in STEP 215), the process proceeds to STEP 245.

In STEP 230, the geometric line in each cluster having the maximum (i.e., highest) confidence value is selected. In STEP 235, one hand-drawn line is determined per cluster using the geometric line selected from the cluster. Specifically, the selected geometric line is used to trace (i.e., identify the pixels) in the image corresponding to a hand-drawn line. These pixels are added to a data structure (e.g., list). In one or more embodiments, various tests are applied to determine if the hand-drawn line is a false positive (i.e., a group of pixels in the image that is actually not a table line). For example, the hand drawn line can be checked to see if it has a large number of gaps or if it intersects with a region of pixels that has been identified as text by a text recognition engine. In such a case, the pixels of the hand-drawn line are not added to the data structure.

In STEP 240, the pixels of the determined hand-drawn lines (i.e., STEP 235) are removed from the image (e.g., set to 0), including the false positive hand-drawn lines. Those skilled in the art, having the benefit of this detailed description, will appreciate that following removal of the determined hand-drawn lines from the image, the image may still have one or more hand-drawn lines. This is especially true if one of the clusters (STEP 220) included geometric lines corresponding to multiple hand-drawn lines in the image.

In STEP 245, a point is calculated for each of the hand-drawn lines in the data structure. The point may be the midpoint of the hand-drawn line, the ¼ point, etc. In STEP 250, the geometry of the table (e.g., upper left corner, extents, number of rows, number of columns, cell positions, etc.) is determined based on the calculated points. Specifically, the table engine (108) may generate new horizontal and vertical geometric lines that pass through calculated points. Any two of the new geometric lines having the same orientation are parallel. In other words, all of the new horizontal geometric lines are parallel. Similarly, all of the new vertical geometric lines are parallel. It is through the use of these new geometric lines and the intersections of these new geometric lines with each other that the geometry of the table can be determined. If the image was previously rotated, it may be necessary to apply a reverse rotation to the newly generated geometric lines to determine the geometry of the table (e.g., upper left corner).

In one or more embodiments of the invention, a high-level object representing the table is generated. This high-level object may specify (e.g., using tags and attributes) the geometry of the table. This high-level object might also include the contents of the table (e.g., contents extracted from the cells in the image through OCR or ICR). In one or more embodiments, the high-level object may be exported to an application for inclusion in an electronic document (e.g., spreadsheet, slide show, word processing document, webpage, etc.).

Figure 3A:
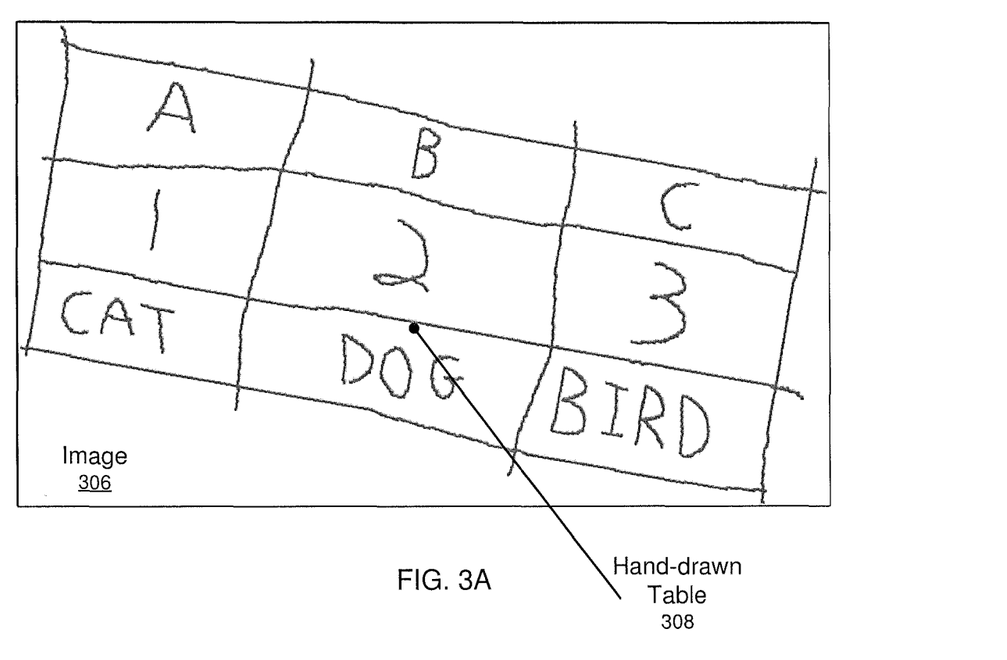
FIGS. 3A-3H show an implementation example in accordance with one or more embodiments of the invention.

FIGS. 3A-3H show an implementation example in accordance with one or more embodiments of the invention. As shown in FIG. 3A, there exists an image (306) with a hand-drawn table (308). Specifically, the table (308) includes hand-drawn lines that form the rows and columns. Each cell of the table (308) includes text. The hand-drawn table (308) is drawn at an angle (i.e., it is not aligned with the horizontal axis and/or vertical axis).

Figure 3B:
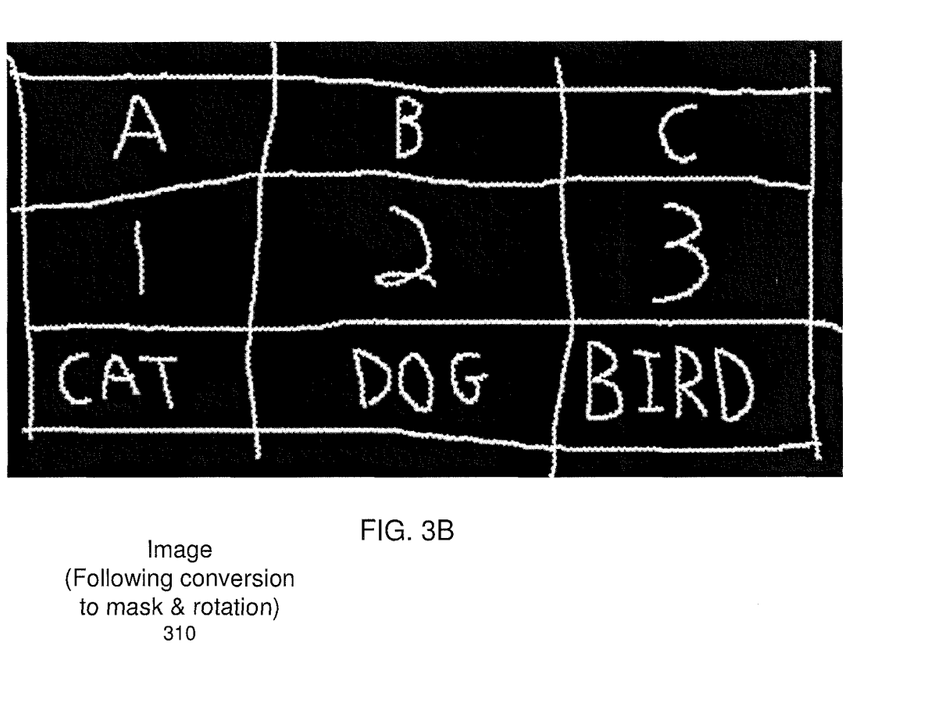

FIG. 3B shows the image (310) after it has been converted to a mask (e.g., binary image). All pixels corresponding to the lines and text characters are set to 1, while all the remaining pixels are set to zero. Moreover, the table has been rotated to make it better align with the horizontal axis and vertical axis.

Figure 3C:
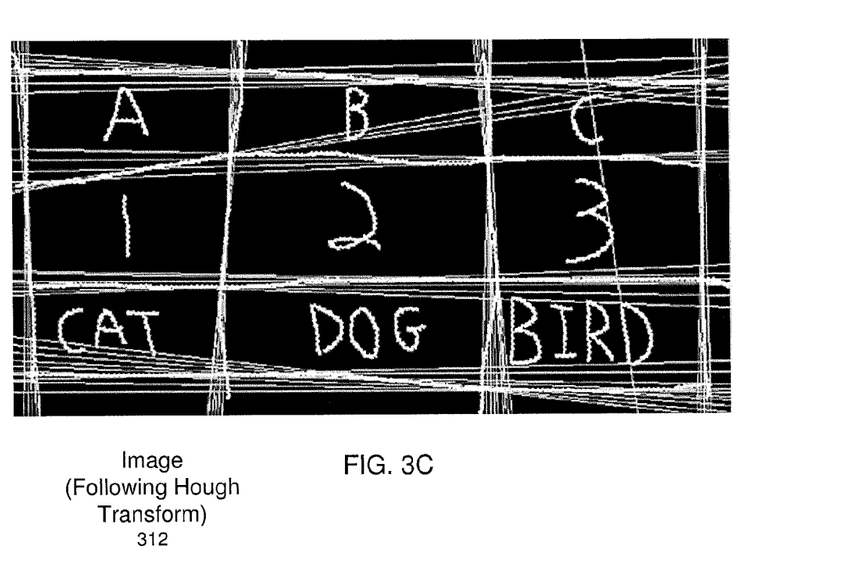

FIG. 3C shows the image (312) following the Hough Transform. The Hough Transform identifies multiple geometric lines within the image. Many of the identified geometric lines are associated with the hand-drawn lines of the table that bound the rows and columns. The Hough Transform also specifies an angle (e.g., with respect to the horizontal or vertical axis) and a confidence value (i.e., the number of pixels in the image that contribute to the identified geometric line) for each identified geometric line.

Figure 3D:
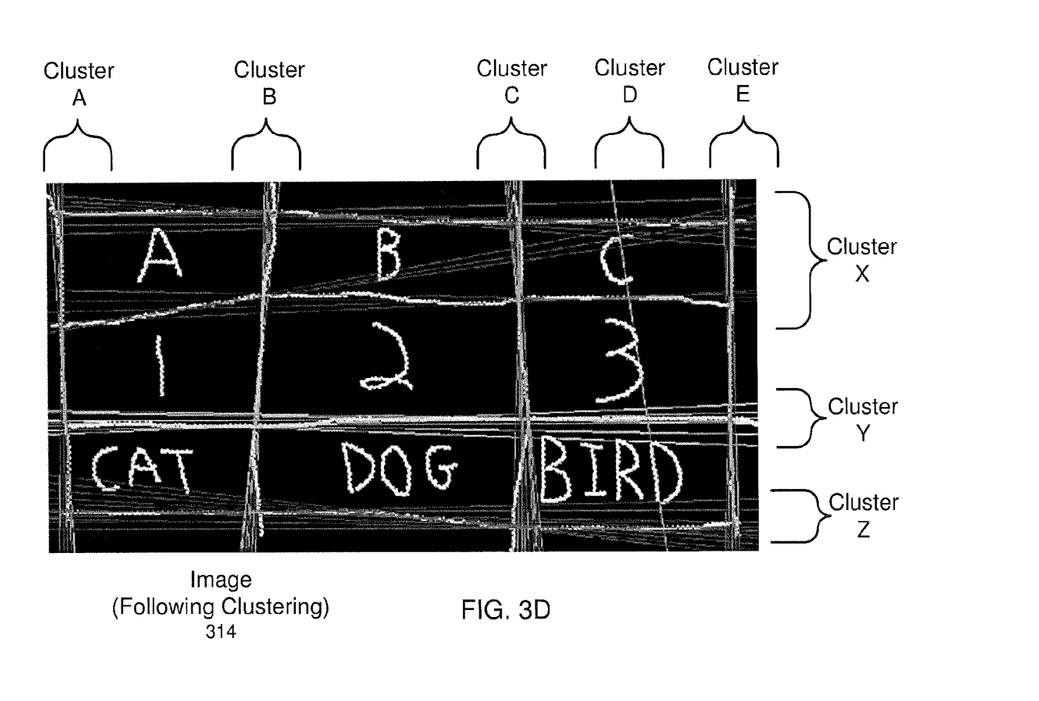

In FIG. 3D, the identified geometric lines are classified as either vertical or horizontal and then grouped into clusters. Clusters A-E have vertical geometric lines, while clusters X-Z have horizontal geometric lines. As shown in FIG. 3D, most clusters are associated with at least one hand-drawn line that bounds a row or column of the table. Moreover, cluster X is associated with two hand-drawn lines. However, cluster D is an example of a false positive. Cluster D is not associated with any hand-drawn line that bounds a row or column of the table.

For each cluster, the geometric line having the highest confidence value is selected. This geometric line is used to determine the pixels of the hand-drawn line associated with the cluster. These pixels are added to a list (not shown) and removed from the image. The exception is the hand-drawn line determined from cluster D. As the determined hand-drawn line from cluster D intersects with text in the table, the hand-drawn line is removed but its pixels are not added to the list.

Figure 3E:
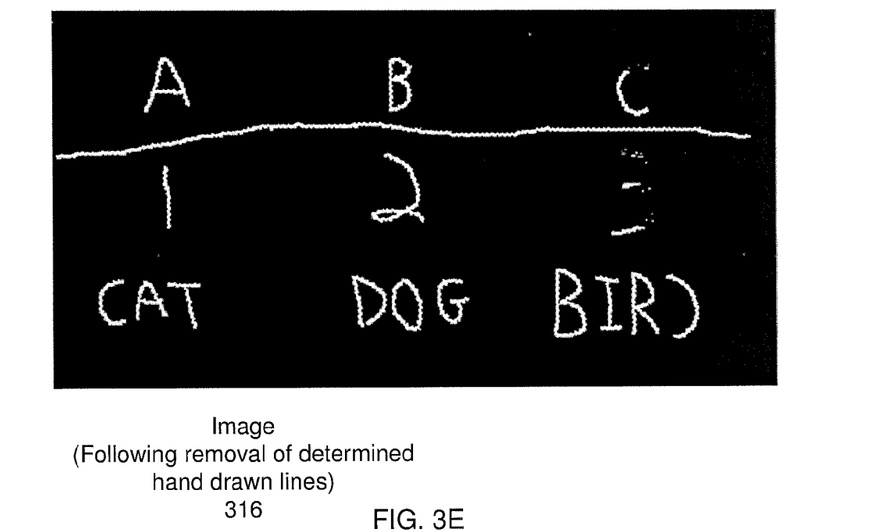

FIG. 3E shows the image (316) following removal of the determined hand-drawn lines and false positives. As shown in FIG. 3E, the only remaining hand-drawn line is one hand-drawn line previously associated with cluster X. The Hough Transform is once again applied to the image to identify geometric lines, the angles of the geometric lines, and the confidence values of the geometric lines.

Figure 3F:
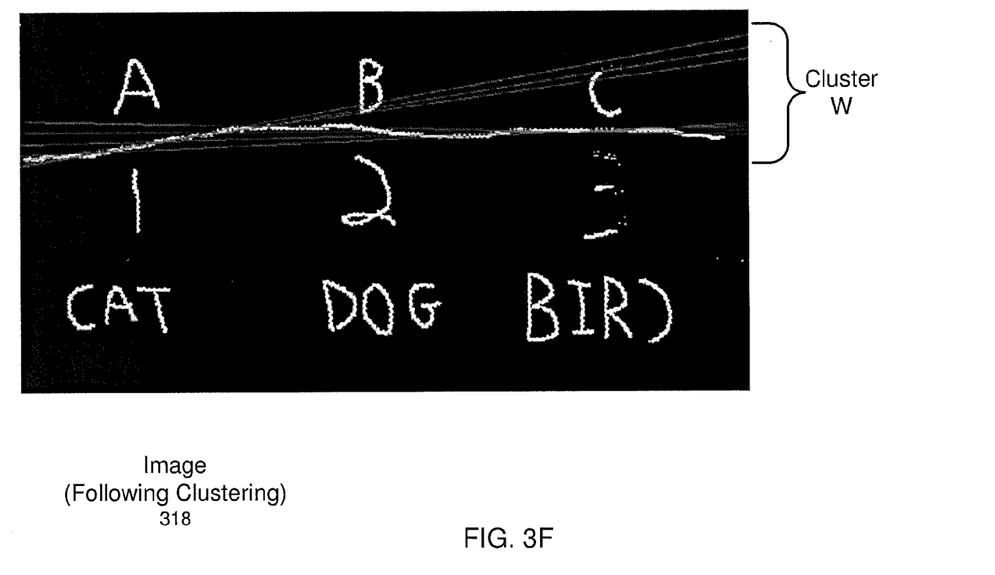

In FIG. 3F, the identified geometric lines are grouped into one or more clusters. As shown in FIG. 3F, there is only one cluster (Cluster W) in the image (318) and it is associated with the remaining hand-drawn line. The geometric line in cluster W having the highest confidence value is used to determine the hand-drawn line associated with cluster W. The pixels of the determined hand-drawn line are added to the list and removed from the image.

Figure 3G:
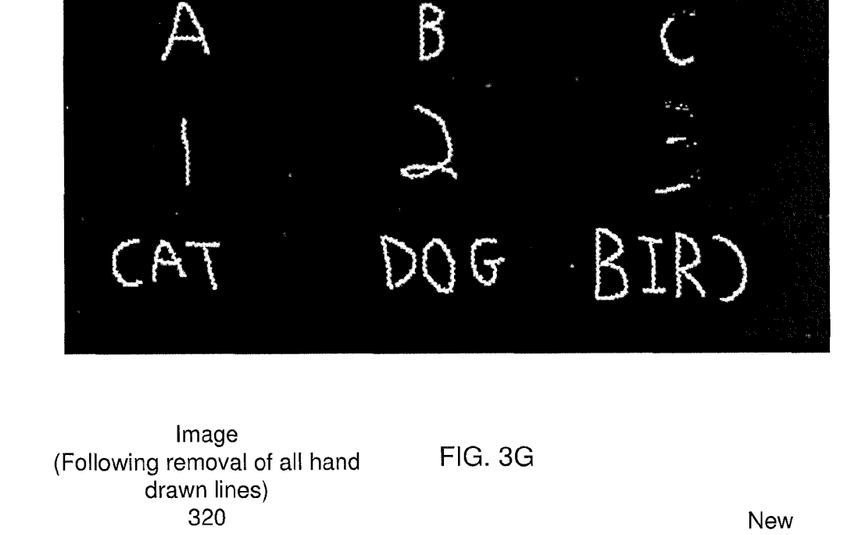

FIG. 3G shows the image (320) following removal of all the hand-drawn lines. As shown in FIG. 3G, no hand-drawn lines remain. The Hough Transform is applied a third time to the image to identify geometric lines, the angles of the geometric lines, and the confidence values of the geometric lines. However, no more geometric lines are found and no additional clusters are detected. Next, a midpoint may be calculated for each of the hand-drawn lines on the list of hand-drawn lines.

Figure 3H:
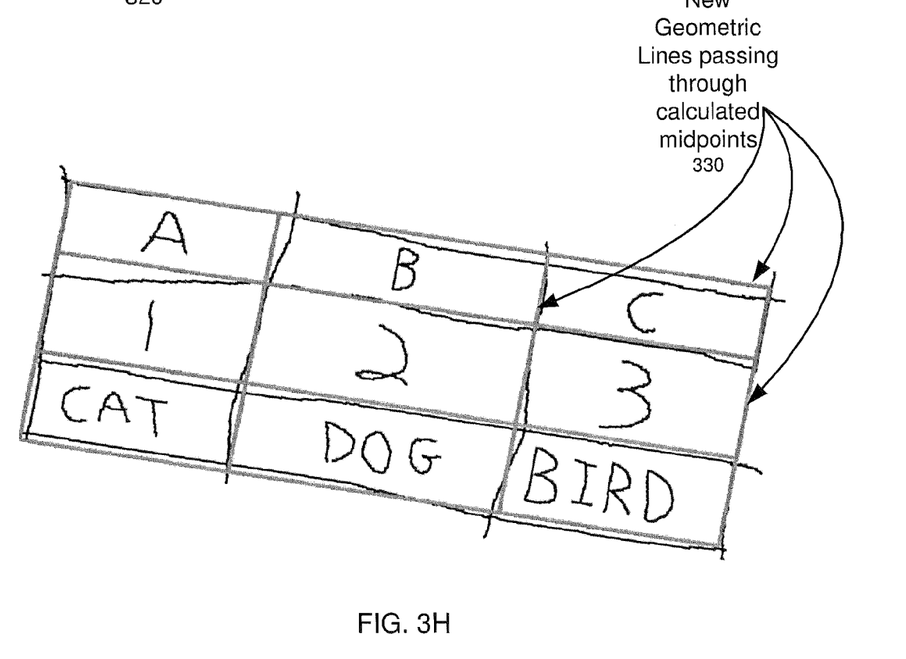

In FIG. 3H, new horizontal or vertical geometric lines (330) passing through the midpoints of the hand-drawn lines are generated in order to determine the geometry of the table (e.g., upper left corner, extents, number of row, number of columns, cell positions, etc.). Moreover, a reverse rotation is applied to the newly generated geometric lines to better match the orientation of the table in the original image. It is through the use of these new geometric lines and the intersections of these new geometric lines with each other that the geometry of the table can be determined.

One or more embodiments of the invention may have the following advantages: the ability to determine the geometry of a hand-drawn table in an image; the ability to determine the hand-drawn lines that form the rows and columns of the table; the ability to identify and remove false positive hand-drawn lines; the ability to calculate the midpoint, ¼ point, etc., of a hand-drawn line; the ability to determine the geometry of the table using new geometric lines that pass through the calculated points of the hand-drawn lines; the ability to generate a high-level object representation of the image for inclusion in an electronic document, etc.

Figure 4:
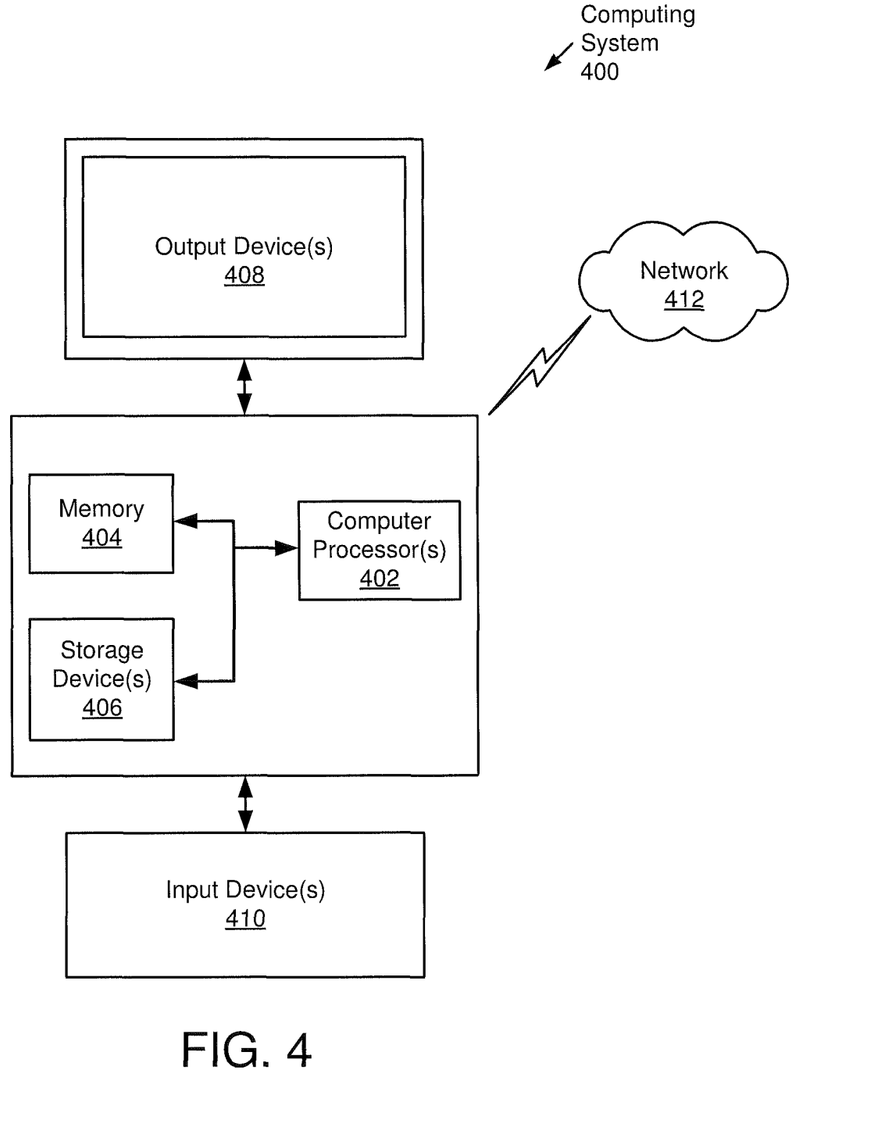
FIG. 4 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and be connected to the other elements over a network (412). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for image processing, comprising:
obtaining an image comprising a table;
generating a first plurality of geometric lines for the image and a plurality of confidence values for the first plurality of geometric lines;
grouping the first plurality of geometric lines into a plurality of clusters;
selecting a subset of the first plurality of geometric lines based on the plurality of confidence values, wherein the subset comprises the geometric lines with the largest confidence value from each of the plurality of clusters;

determining, after generating and grouping the first plurality of geometric lines, a plurality of hand-drawn lines in the image corresponding to the table from the subset;

calculating, after generating and grouping the first plurality of geometric lines, a plurality of points for the plurality of hand-drawn lines; and determining a geometry of the table based on the plurality of points.

2. The method of claim 1, further comprising:

removing the plurality of hand-drawn lines from the image;

identifying a second plurality of geometric lines in the image after removing the plurality of hand-drawn lines;

grouping the second plurality of geometric lines into a new plurality of clusters;

determining one or more hand-drawn lines corresponding to the table based on the new plurality of clusters; and calculating one or more midpoints of the one or more hand-drawn lines, wherein the geometry of the table is further determined based on the one or more midpoints of the one or more hand-drawn lines.

3. The method of claim 1, further comprising:

determining that a hand-drawn line of the plurality of hand-drawn lines is a false positive;

removing the hand-drawn line from the plurality of hand-drawn lines before calculating the plurality of points; and removing the hand-drawn line from the image.

4. The method of claim 3, wherein the hand-drawn line is a false positive because the hand-drawn line intersects with a text character in the table or the number of gaps in the hand-drawn line exceeds a threshold.

5. The method of claim 1, wherein grouping the first plurality of geometric lines comprises:

classifying a first subset of the first plurality of geometric lines as horizontal;

classifying a second subset of the first plurality of geometric lines as vertical;

determining an intersection of a first geometric line in the first subset with a second geometric line in the first subset; and generating a first cluster of the plurality of clusters comprising the first geometric line and the second geometric line in response to determining the intersection.

6. The method of claim 5, wherein grouping the first plurality of geometric lines further comprises:

determining a third geometric line in the first subset that is parallel with and within a threshold of pixels from at least one selected from a group consisting of the first geometric line and the second geometric line, wherein the first cluster further comprises the third geometric line.

7. The method of claim 1, wherein identifying the first plurality of geometric lines comprises applying the Hough Transform to the image.

8. The method of claim 1, wherein determining the plurality of hand-drawn lines comprises:

selecting a cluster of the plurality of clusters;

identifying a geometric line in the cluster with the maximum confidence value; and tracing a hand-drawn line in the image using the geometric line in the cluster with the maximum confidence value.

9. The method of claim 1, wherein:

each of the plurality of points is a midpoint of one of the plurality of hand-drawn lines, determining the geometry of the table comprises generating new geometric lines passing through the plurality of points, and any two of the new geometric lines having the same orientation are parallel.

10. The method of claim 1, further comprising:

converting the image to a mask before identifying the first plurality of geometric lines; and rotating the image to offset a rotation of the table.

11. A non-transitory computer readable medium (CRM) storing computer readable program code embodied therein that:

obtains an image comprising a table;

generates a first plurality of geometric lines for the image and a plurality of confidence values for the first plurality of geometric lines;

groups the first plurality of geometric lines into a plurality of clusters;

selects a subset of the first plurality of geometric lines based on the plurality of confidence values, wherein the subset comprises the geometric lines with the largest confidence value from each of the plurality of clusters;

determines, after generating and grouping the first plurality of geometric lines, a plurality of hand-drawn lines in the image corresponding to the table from the subset;

calculates, after generating and grouping the first plurality of geometric lines, a plurality of points for the plurality of hand-drawn lines; and determines a geometry of the table based on the plurality of points.

12. The non-transitory CRM of claim 11, further storing computer readable program code embodied therein that:

removes the plurality of hand-drawn lines from the image;

identifies a second plurality of geometric lines in the image after removing the plurality of hand-drawn lines;

groups the second plurality of geometric lines into a new plurality of clusters;

determines one or more hand-drawn lines corresponding to the table based on the new plurality of clusters; and calculates one or more midpoints of the one or more hand-drawn lines, wherein the geometry of the table is further determined based on the plurality of midpoints of the one or more hand-drawn lines.

13. The non-transitory CRM of claim 11, wherein grouping the first plurality of geometric lines comprises:

classifying a first subset of the first plurality of geometric lines as horizontal;

classifying a second subset of the first plurality of geometric lines as vertical;

determining an intersection of a first geometric line in the first subset with a second geometric line in the first subset;

determining a third geometric line in the first subset that is parallel with and within a threshold of pixels from at least one selected from a group consisting of the first geometric line and the second geometric line; and generating a first cluster of the plurality of clusters comprising the first geometric line, the second geometric line, and the third geographic line.

14. The non-transitory CRM of claim 11, wherein:

identifying the first plurality of geometric lines comprises applying the Hough Transform to the image; and determining the plurality of hand-drawn lines comprises:
   selecting a cluster of the plurality of clusters;
   identifying a geometric line in the cluster with the maximum confidence value; and
   tracing a hand-drawn line in the image using the geometric line in the cluster with the maximum confidence value.

15. The non-transitory CRM of claim 11, wherein:
each of the plurality of points is a midpoint of one of the plurality of hand-drawn lines;
determining the geometry of the table comprises generating new geometric lines passing through the plurality of points; and
any two of the new geometric lines having the same orientation are parallel.

16. A system for image processing, comprising:
a computer processor connected to a memory that:
   stores an image comprising a table;
   generates a first plurality of geometric lines for the image and a plurality of confidence values for the first plurality of geometric lines;
   groups the first plurality of geometric lines into a plurality of clusters;
   selects a subset of the first plurality of geometric lines based on the plurality of confidence values, wherein the subset comprises the geometric lines with the largest confidence value from each of the plurality of clusters;
   determines, after generating and grouping the first plurality of geometric lines, a plurality of hand-drawn lines in the image corresponding to the table from the subset;
   calculates, after generating and grouping the first plurality of geometric lines, a plurality of points for the plurality of hand-drawn lines; and
   determines a geometry of the table based on the plurality of points.

17. The system of claim 16, wherein the computer processor also:
   identifies a second plurality of geometric lines in the image after the first plurality of geometric lines is removed from the image;
   groups the second plurality of geometric lines into a new plurality of clusters;
   determines one or more hand-drawn lines corresponding to the table based on the new plurality of clusters; and
   calculates one or more midpoints of the one or more hand-drawn lines,
   wherein the geometry of the table is further determined based on the one or more midpoints of the one or more hand-drawn lines.

18. The system of claim 16, wherein the computer processor groups the first plurality of geometric lines by:
   classifying a first subset of the first plurality of geometric lines as horizontal;
   classifying a second subset of the first plurality of geometric lines as vertical;
   determining an intersection of a first geometric line in the first subset with a second geometric line in the first subset;
   determining a third geometric line in the first subset that is parallel with and within a threshold of pixels from at least one selected from a group consisting of the first geometric line and the second geometric line; and
   generating a first cluster of the plurality of clusters comprising the first geometric line, the second geometric line, and the third geographic line.

19. The system of claim 16, wherein the computer processor:
   identifies the first plurality of geometric lines by applying the Hough Transform to the image; and
   determines the plurality of hand-drawn lines by:
     selecting a cluster of the plurality of clusters;
     identifying a geometric line in the cluster with the maximum confidence value; and
     tracing a hand-drawn line in the image using the geometric line in the cluster with the maximum confidence value.

20. The system of claim 16, wherein:
each of the plurality of points is a midpoint of one of the plurality of hand-drawn lines;
determining the geometry of the table comprises generating new geometric lines passing through the plurality of points; and
any two of the new geometric lines having the same orientation are parallel.

* * * * *